United States Patent [19]
Clarke et al.

[11] Patent Number: 5,226,401
[45] Date of Patent: Jul. 13, 1993

[54] METHOD AND APPARATUS FOR EXHAUST GAS RECIRCULATION VIA REVERSE FLOW MOTORING

[75] Inventors: John M. Clarke, Chillicothe; James J. Faletti, Spring Valley, both of Ill.

[73] Assignee: Caterpillar Inc., Peoria, Ill.

[21] Appl. No.: 891,606

[22] Filed: Jun. 1, 1992

[51] Int. Cl.$^5$ ............................................. F02M 25/07
[52] U.S. Cl. ..................................... 123/571; 123/569
[58] Field of Search .................. 123/64, 90.15, 568, 123/90.11, 571, 569, 570

[56] References Cited

U.S. PATENT DOCUMENTS

| | | | |
|---|---|---|---|
| 4,210,109 | 7/1980 | Nakajima et al. | 123/76 |
| 4,271,810 | 6/1981 | Lancaster | 123/568 |
| 4,424,790 | 1/1984 | Curtil | 123/559 |
| 4,485,794 | 12/1984 | Kimberley et al. | 123/569 |
| 4,643,157 | 2/1987 | Nishikawa et al. | 123/568 |
| 4,854,291 | 8/1989 | Eisbett et al. | 123/569 |
| 4,958,490 | 9/1990 | Harjunpaa | 60/274 |
| 4,958,606 | 9/1990 | Hitomi et al. | 123/316 |
| 5,005,552 | 4/1991 | Kawamura | 123/571 |

FOREIGN PATENT DOCUMENTS

| | | |
|---|---|---|
| WO7-168034A | 10/1982 | Japan . |
| 62-00316A | 1/1987 | Japan . |
| 9105945 | 5/1991 | PCT Int'l Appl. . |

Primary Examiner—Noah P. Kamen
Attorney, Agent, or Firm—Kenneth A. Rhoads

[57] ABSTRACT

One way of reducing nitrogen oxide emissions from an engine having a plurality of combustion chambers is through exhaust gas recirculation. The present invention provides an apparatus for exhaust gas recirculation by causing at least a selected subset of the combustion chambers to be operated in a four-stroke reverse flow motoring mode of operation while the remaining combustion chambers are operated is a normal four-stroke mode. In the four-stroke reverse flow motoring mode of operation, exhaust gas is inducted into the combustion chamber of a selected subset of combustion chambers. The exhaust gas is then compressing and expanded in the combustion chambers. Cooling of the exhaust gas is achieved during the compression and expansion strokes. The cooled exhaust gas is then expelled from the combustion chambers to be mixed with fresh charge air.

14 Claims, 4 Drawing Sheets

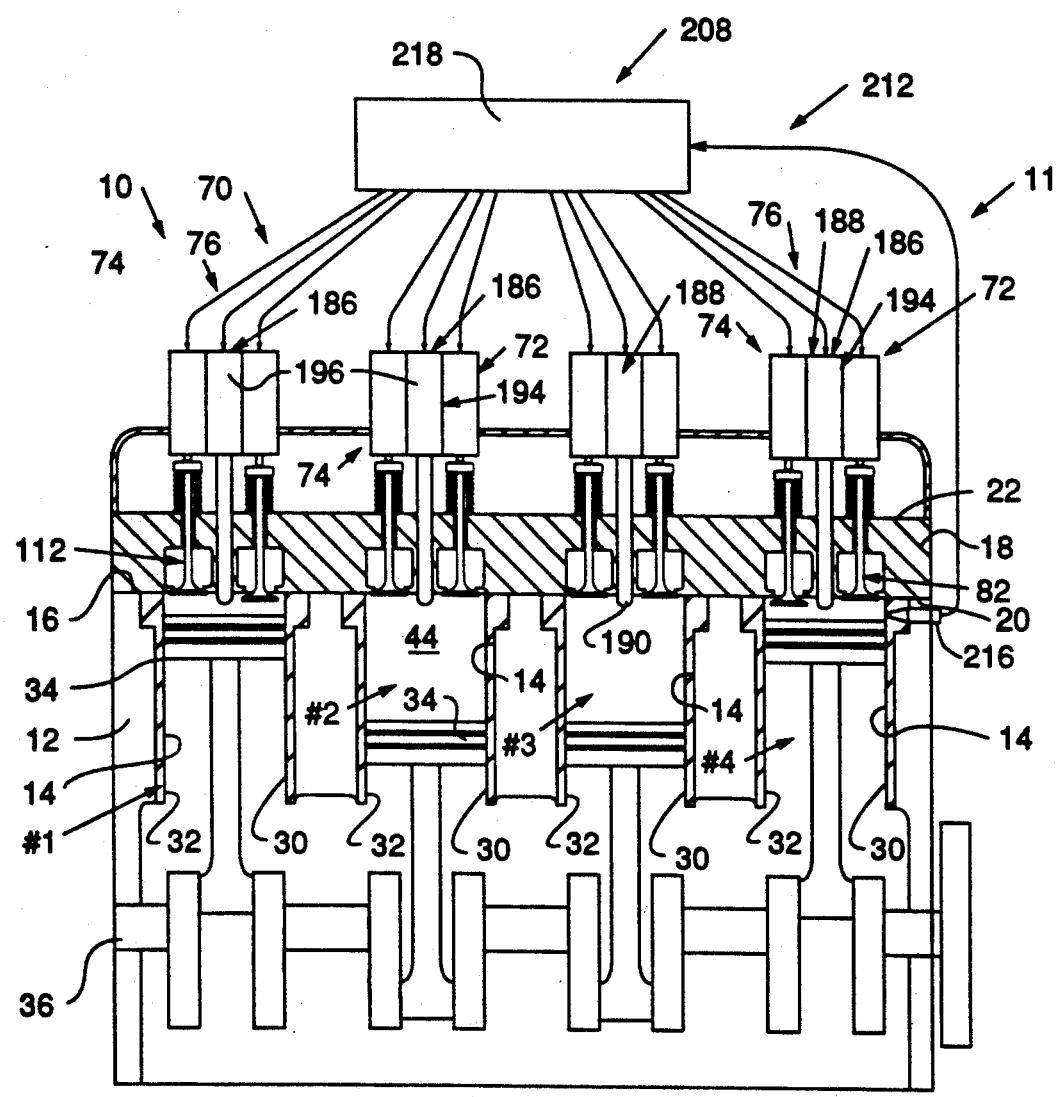

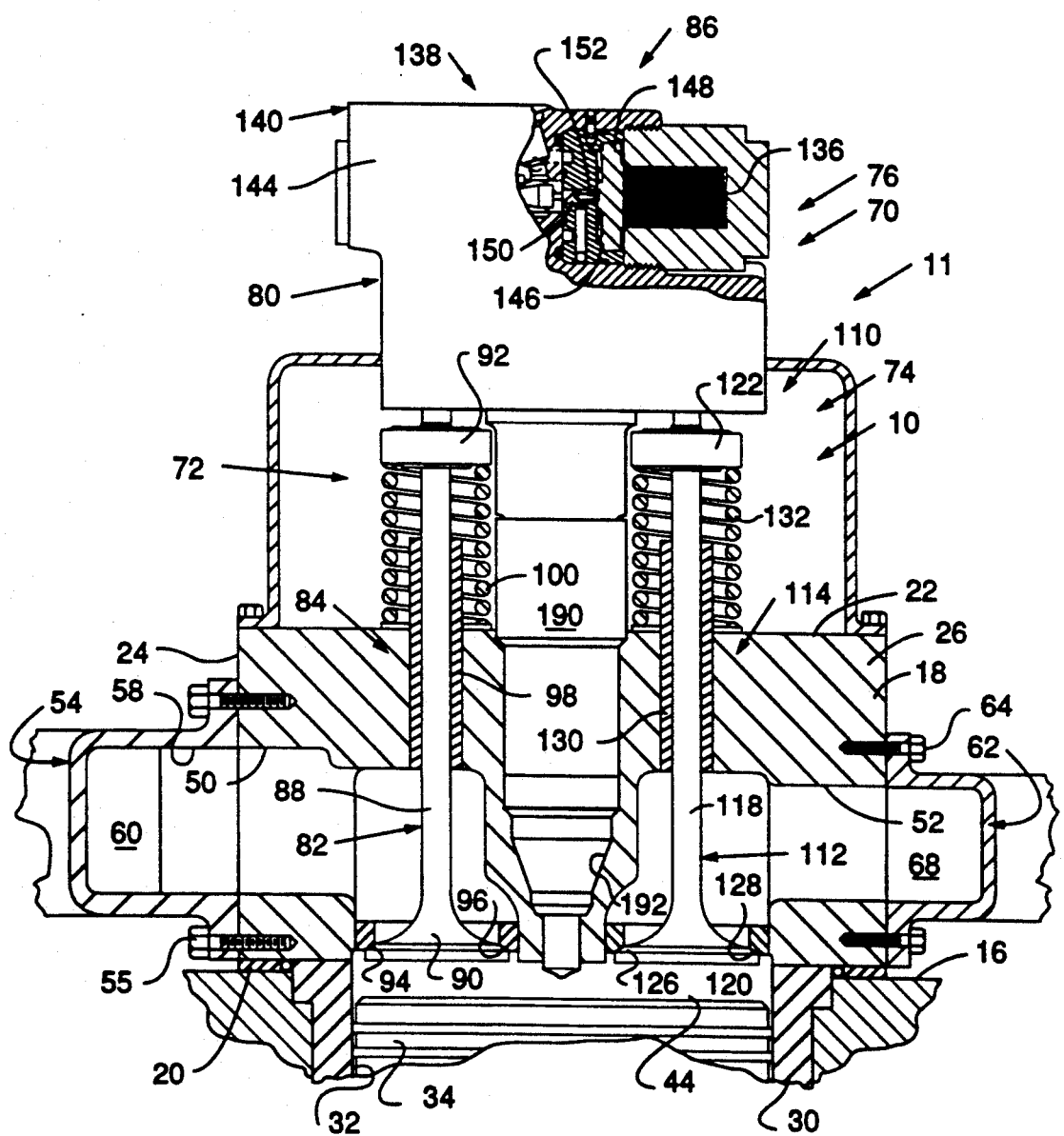

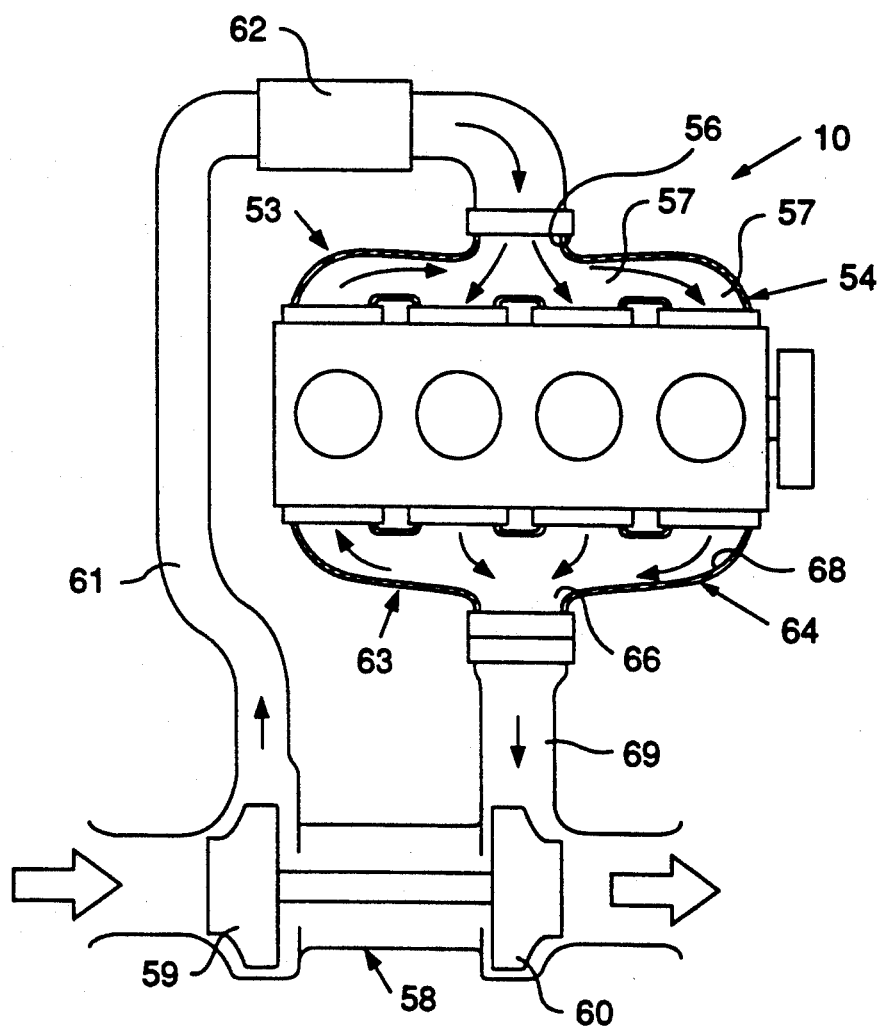

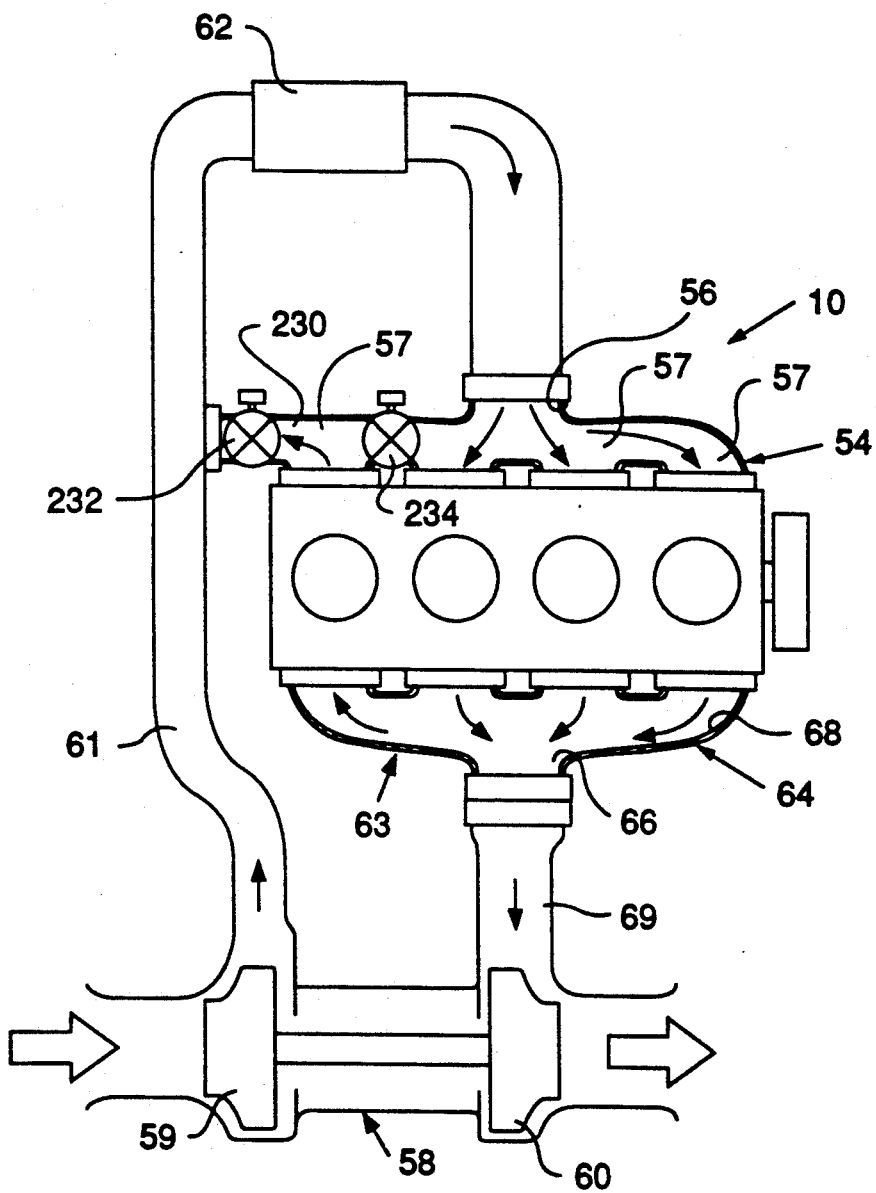

METHOD AND APPARATUS FOR EXHAUST GAS RECIRCULATION VIA REVERSE FLOW MOTORING

TECHNICAL FIELD

The present invention relates generally to the controlled operation of engine operation cycles and more particularly to a preestablished logic pattern and the modifying the preestablished logic pattern to sequentially, and modulateably controlling valve timing for exhaust gas recirculation to reduce nitrogen oxide (NOx) emissions.

BACKGROUND ART

Future diesel engines need to comply with nitrogen oxide (NOx) emission standards which are continually being reduced. The emission standards are aimed at reducing air pollution from exhaust gases in line with the public interest in environmental protection. Generally speaking, there are two techniques of reducing NOx emission. One is improving combustion by lowering the combustion temperature and the other is after treatment of exhaust gases. In the conventional engine after treatment of exhaust gases by means of a catalytic converter is the main technique used to reduce NOx. This technique, however, has demerits of durability of the converter or air/fuel ratio control system especially oxygen sensors as well as cost. For the larger engine, these demerits become more severe problems. Whereas the technique for lowering NOx through improvement of combustion has merit especially with regard to durability and thermal efficiency of the engine.

Exhaust gas recirculation (EGR) has been shown to reduce NOx emissions with smaller brake specific fuel consumption (BSFC) and exhaust smoke penalties. Exhaust gas recirculation lowers NOx by diluting the fresh charge air with exhaust gas which lowers peak combustion temperatures and thus, reduces NOx production.

A preferred method of EGR is to have the exhaust gas cooled before being mixed with the charge air. Previous means of providing cooled EGR include transferring exhaust gas from the exhaust system to the air inlet system using external engine plumbing, a pump, and a heat exchanger to cool the exhaust gas. The exhaust gas is transferred from the exhaust system before or after the turbocharger turbine and to the air intake system before or after the turbocharger compressor. The result being increased customer cost and a greater possibility of hardware failure due to an increased number of components and complexity.

Thus, what is needed is an apparatus to obtain cooled EGR without the external hardware by using the capabilities within an engine having electronically controlled unit intake and exhaust valves and fuel injectors.

The present invention is directed to overcome one or more of the problems as set forth above.

DISCLOSURE OF THE INVENTION

In one aspect of the invention, an apparatus adapted for use with a engine including a plurality of combustion chambers, an intake port and an exhaust port for each combustion chamber. A piston is reciprocally movable in each of the combustion chambers forming an intake stroke, a compression stroke, an expansion stroke, and an exhaust stroke. The apparatus includes flow control means including intake means for selectively blocking and permitting flow into and away from each of the combustion chambers and exhaust means for selectively blocking and permitting flow into and away from each of the combustion chambers. The apparatus further includes means for actuating each of the intake means and the exhaust means independently in response to a control signal and electronic control means responsive to sensed operating parameters. The electronic control means is responsive to sensed operating parameters of the engine for causing the exhaust means of a selected subset of combustion chambers to be initiated inducting exhaust gas into the combustion chamber from the exhaust conducting means, compressing the exhaust gas in the combustion chamber, expanding the exhaust gas in the combustion chamber, and expelling the exhaust gas into the intake conducting means by initiation of the intake means.

In another aspect of the invention, a method of operating an engine having a plurality of combustion chambers, an intake port and an exhaust port for each of the combustion chambers, and a piston reciprocally movable in each of the combustion chambers is comprised of the following steps: monitoring the operating condition of the engine, outputting a control signal to intake means and exhaust means, actuating each of the intake means and the exhaust means independently in response to a control signal, inducting exhaust gas into the combustion chamber from the exhaust conducting means, compressing the exhaust gas in the combustion chamber, expanding the exhaust gas in the combustion chamber, and expelling the exhaust gas into the intake conducting means by initiation of the intake means.

BRIEF DESCRIPTION OF THE DRAWINGS

FIG. 1 is a diagrammatic side partially sectional view of an engine having an embodiment of the present invention;

FIG. 2 is a cross-sectional view of a portion of the engine of FIG. 1;

FIG. 3 is a diagrammatic plan partially sectional view of the engine of FIG. 1; and FIG. 4 is a diagrammatic plan partially sectional view of an engine having an alternate embodiment of the present invention.

BEST MODE FOR CARRYING OUT THE INVENTION

Referring to FIGS. 1, 2, and 3, an inline type, four cylinder, compression ignition, internal combustion, turbocharged engine 10 is schematically illustrated. The engine 10 includes an apparatus 11 to obtain cooled exhaust gas recirculation (EGR). The engine 10, in this specific instance, operates in a conventional four-stroke mode having sequential intake, compression, expansion, and exhaust strokes. Although the present invention will be described and disclosed with respect to an inline type four cylinder engine 10, it is recognized that the system could equally be used on for example, a turbocharged, multi-cylinder, vee type engine having different operating modes.

The engine 10 includes a block 12 defining a plurality of cylinder bores 14 and a top block mounting surface 16. The engine 10 further includes a cylinder head 18 having a bottom head mounting surface 20, a top head surface 22, a first head side mounting surface 24, and a second head side mounting surface 26. The bottom head mounting surface 20 is seated on the top block mounting surface 16 and rigidly attached thereto in the usual way by a plurality of fasteners not shown. Alternatively, the block 12 and the cylinder head 18 could be of an integral design.

In this application, a replaceable cylinder liner 30 having a piston liner bore 32 is positioned within each of the cylinder bores 14. The liner bores 32 define a plurality of cylinders #1, #2, #3, and #4. Each piston bore 32 has a piston 34 slidably disposed therein for driving a crankshaft 36 in a conventional manner. The crankshaft 36 is rotatively supported in the block 12. The pistons 34 reciprocally move in their respective liner bores 32 between a top dead center (TDC) position and a bottom dead center (BDC) position. A combustion chamber 44 is formed by the cylinder head 18, the liner bore 32, and the piston 34.

As representatively illustrated in FIG. 2, the cylinder head 18 defines for each of the combustion chambers 44 of the cylinders #1, #2, #3, and #4, an intake port 50 and an exhaust port 52. Each of the intake ports 50 extend from the first head side mounting surface 24 to the bottom head mounting surface 20. Each of the exhaust ports 52 extend from the second head side mounting surface 26 to the bottom head mounting surface 20.

The engine 10, in this specific instance, is operable in the normal four-stroke mode. The four-stroke mode defines a first predetermined logic pattern in which the pistons 34 are reciprocally movable in each of the combustion chambers 44 between the top dead center position and the bottom dead center position forming an intake stroke during which fresh charge air is introduced from the intake port 50 into the combustion chamber 44. The pistons 34 are further movable between the bottom dead center position and the top dead center position forming a compression stroke during which the fresh charge air in the combustion chamber 44 is compressed to an established temperature range and fuel is introduced at or before top dead center during which a desired ignition delay period occurs prior to combustion of the mixture of fuel and air in the combustion chambers 44. Combustion of the fuel and air mixture occurs near top dead center movement of the pistons 34. As a result of combustion, the pistons 34 are driven in the combustion chambers 44 between the top dead center position and a bottom dead center position by the expanding exhaust gas forming an expansion stroke. The pistons 34 are movable between the bottom dead center position and the top dead center position forming an exhaust stroke during which exhaust gas is expelled from the combustion chamber 44 into the exhaust port 52.

As best shown in FIGS. 2 and 3, an intake conducting means 53 is operatively connected to the combustion chambers 44 for directing flow into and away from the combustion chambers. The intake conducting means 53 includes an intake manifold 54 rigidly attached to the first head side surface 24, in the usual way, by a plurality of fasteners 55. The intake manifold 54 defines an intake manifold passage 56 and a plurality of interconnected intake manifold branch passages 57. The intake manifold branch passages 57 are in fluid communication with the intake ports 50 in a conventional manner.

The engine 10 further includes a turbocharger 58 having an incoming air compressor 59 and an exhaust gas driven turbine 60. The compressor 59 is operatively connected to the intake manifold passage 56 by an intake conduit 61, in the conventional manner, providing supercharged air to the combustion chambers 44. A cooler 62 is interposed in the intake conduit 61 between the compressor 59 and the intake manifold passage 56.

Exhaust conducting means 63 is operatively connected to the combustion chambers 44 for directing flow into and away from the combustion chambers. The exhaust conducting means 63 includes an exhaust manifold 64 rigidly attached to the second head mounting surface 26, in the usual manner, by a plurality of fasteners 65. The exhaust manifold 64 defines an exhaust manifold passage 66 and a plurality of interconnected exhaust manifold branch passages 68. The exhaust manifold branch passages 68 are in fluid communication with the exhaust ports 52 in a conventional manner.

The exhaust gas driven turbine 60 of the turbocharger 58 is operatively connected to the exhaust manifold passage 66 by an exhaust gas conduit 69. Exhaust gas from the combustion chambers 44 drives the turbine 60 which, in turn, drives the compressor 59 in a conventional manner.

The engine 10 further includes flow control means 70 for selectively communicating the intake manifold 54 and the exhaust manifold 62 with the combustion chambers 44. The flow control means 70 includes for each of the combustion chambers 44, intake means 72, exhaust means 74, and means 76 for actuating each of the intake means and the exhaust means independently in response to a control signal.

The intake means 72 includes, in this specific instance, an intake valve 82 operatively mounted in each one of the intake ports 50 and intake valve support means 84 for reciprocally supporting the intake valve 82 in the cylinder head 18. It is recognized that the intake means 72 could include multiple intake valves 82 and intake valve support means 84.

The intake valve 82 includes an intake valve stem 88, an intake valve head portion 90 disposed at one end of the intake valve stem and an enlarged intake valve retainer 92 disposed at an opposite end. The intake valve head portion 90 defines an annular intake valve sealing surface 94 of a dimension sufficient for sealingly seating on an annular intake port seating face 96 about the intake port 50.

The intake valve support means 84 includes an intake valve guide 98. The intake valve guide 98 is mounted in the cylinder head 18 and encompasses the intake valve stem 88. An intake valve spring 100 is disposed about the intake valve stem 88 and extends between the top head surface 22 and the intake valve retainer 92. The intake valve spring 100 urges the intake valve sealing surface 94 against the intake port seating face 96 until the intake valve seating surface is moved away from the intake port seating face.

Referring to FIGS. 1 and 2, the exhaust means 74 includes, in this specific instance, an exhaust valve 112 operatively mounted in each one of the exhaust ports 52, and an exhaust valve support means 114 for reciprocally supporting the exhaust valve 112 in the cylinder head 18. It is recognized that the exhaust means could include multiple exhaust valves 112 and exhaust valve support means 154.

The exhaust valve 112 includes an exhaust valve stem 118, an exhaust valve head portion 120 disposed at one end of the exhaust valve stem, and an exhaust valve retainer 122 disposed at an opposite end. The exhaust valve head portion 120 defines an annular exhaust valve sealing surface 126 of a dimension sufficient for sealingly seating on an annular exhaust port seating face 128 defined about the exhaust port 52.

The exhaust valve support means 114 includes an exhaust valve guide 130. The exhaust valve guide 130 is mounted in the cylinder head 18 and encompasses the exhaust valve stem 118. An exhaust valve spring 132 is disposed about the exhaust valve stem 118 and extends between the top head surface 22 and the exhaust valve retainer 122. The exhaust valve spring 132 urges the exhaust valve sealing surface 126 against the exhaust port seating face 168 until the exhaust valve seating surface is moved away from the exhaust port seating face 128.

In the preferred embodiment, as best shown in FIG. 2, the means 76 for actuating each of the intake means 72 and exhaust means 74 includes a like number of piezoelectric motors 136, only one shown. It is recognized that in place of the piezoelectric motors 136, solenoids, voice coils, or linear displaceable electromagnetic assemblies could be used. Each piezoelectric motor 136 is housed in unit valve actuator means 138. The unit valve actuator means 138 includes a valve actuator assembly 140 operatively engaged with the respective intake and exhaust valves 82 and 112 adjacent the respective intake and exhaust valve end retainers 92 and 122 for electronically manipulating the intake and exhaust valves. The valve actuator assembly 140 includes, a valve actuator housing 144 having a stepped cavity 146 in which is positioned an actuator valve drive piston 148, an actuator valve amplifier piston 150, and an actuator valve fluid chamber 152 therebetween.

The piezoelectric motor 136, which is well-known in the art, expands linearly responsive to electrical excitation by a preestablished quantity of energy and contracts when the electrical excitation is ended. Variations in the amount of electrical excitation will cause the piezoelectric motor 136 to expand linearly dependent on the amount of electrical excitation. The piezoelectric motor 136 generates a high force in a linear direction, however, its linear expansion is less than what is required to displace the intake and exhaust valve sealing surfaces 94 and 126 away from the intake and exhaust port seating faces 96 and 128. Therefore, the actuator valve drive piston 148, actuator valve amplifier piston 150, and the actuator valve fluid chamber 152 are provided to translate and amplify linear displacement of the piezoelectric motor 136 in the following manner. The actuator valve amplifier piston 150 is sized much smaller than the actuator valve drive piston 148 because the hydraulic amplification ratio of the linear displacement of the actuator valve driver piston 148 as it relates to the linear displacement of the actuator valve amplifier piston 150 is inversely proportional to the surface area ratio of the actuator valve driver piston 148 to the actuator valve amplifier piston 150. Thus, small linear displacement of the piezoelectric motor 136 is amplified to produce significantly greater linear displacement of the actuator valve amplifier piston 150.

The engine 10 further includes fuel injector means 186 for each of the combustion chambers 44. The fuel injector means 186 includes an electronic controlled injector operating mechanism 188. As best shown in FIGS. 1 and 2, the electronic controlled injector operating mechanism 188 includes an electronically controlled unit fuel injector 190 of a conventional design disposed in a stepped injector bore 192 defined in the cylinder head 18 and the means 76 for electronically controlling each of the unit fuel injectors 190 independently. The means 76 is operatively engaged with each unit fuel injector 190. Because the means 76 for the unit fuel injector 190 is essentially the same design and functions in essentially the same manner as means 76 for the intake and exhaust means 72 and 74, they will not be described in detail. As an alternative, any conventional fuel system could be used.

As shown in FIG. 1, an electronic control system 208 is operatively connected to the actuating means 76 and adapted to direct appropriate control signals therefrom to the actuating means to functionally control the engine 10 in the first predetermined logic pattern for normal four-stroke mode operation.

The apparatus 11 is adapted for use with an engine 10 for exhaust gas recirculation via reverse flow motoring. The apparatus 11 includes an electronic control means 212 for causing the control signals to be outputted to the actuating means 76 in a second predetermined logic pattern different than the first predetermined logic pattern. The electronic control means 212 includes the electronic control system 208, the control signals, a plurality of sensors 216, one of which is shown, and a microprocessor 218. The sensors 216 relay information concerning the operating parameters of the engine 10, such as, fuel rack position, nitrogen oxide (NOx), engine speed (RPM), load, boost pressure level, temperature, rpm's, and air-fuel mixture to the microprocessor 218.

In the second predetermined logic pattern, the electronic control means 212 is responsive to the sensed operating parameters of the engine 10 causing a selected subset of the combustion chamber 44 to be operated in a four-stroke reverse flow motoring mode of operation while the others remain in the normal four-stroke mode of operation. In the four-stroke reverse flow motoring mode a portion of the exhaust gas cooled is recirculated and combined with the fresh charge air. It should be recognized that the selected subset could be a single combustion chamber 44 or conversely the selected subset could be two or more combustion chambers without departing from the essence of the invention.

The four-stroke reverse flow motoring mode has sequential reverse flow motoring intake, reverse flow motoring compression, reverse flow motoring expansion, and reverse flow motoring exhaust strokes. In the reverse flow motoring intake stroke the pistons 34 of the selected subset are reciprocally movable in the combustion chambers 44 between the top dead center position and the bottom dead center position during which exhaust gas is introduced back into the combustion chambers 44 from the exhaust manifold branch passages 59 by the downstroke of the piston. During the reverse flow motoring intake stroke the intake valve 82 remains sealingly seated on the intake port seating face 96 preventing the induction of fresh charge air from the intake manifold branch passages 56.

In the reverse flow motoring compression stroke, the pistons 34 are movable between the bottom dead center position and the top dead center position during which the exhaust gas is compressed in the combustion chamber 44 by the upstroke of the pistons. During the reverse flow motoring compression stroke, the intake valves 82 and the exhaust valve 112 remain sealingly seated on their respective intake port seating face 96 and exhaust port seating face 128. During the reverse flow motoring compression stroke, the fuel injector actuator assemblies 196 for the selected subset of the combustion chambers 44 are not actuated for the injection of fuel into the combustion chambers 44.

In the reverse flow motoring expansion stroke, the pistons 34 are movable on a down stroke in the combustion chambers 44 between the top dead center position and a bottom dead center position during which the exhaust gas expands in the combustion chamber 44. During the reverse flow motoring expansion stroke, the intake valves 82 and the exhaust valves 112 remain sealingly seated on their respectively intake port seating faces 96 and exhaust port seating faces 128.

In the reverse flow motoring exhaust stroke, the pistons 34 are movable between the bottom dead center position and the top dead center position during which exhaust gas is pumped into the intake manifold branch passages from the combustion chambers 44 by the upstroke of the piston 34. During the reverse flow motoring exhaust stroke, the intake means 72 are initiated, opening the intake valves 82 while the exhaust valves 112 remain sealingly seated on the exhaust port seating face 128.

Referring now to FIG. 4, an alternate embodiment of the invention is disclosed. In this embodiment, a conduit 230 is connected between the intake conduit 60 and one of the intake manifold branch passages 56. The connection of the conduit 230 to the conduit 60 is located between the compressor 58 of the turbocharger 59 and the cooler 62. A first electronically controlled valve 232 is operatively located in the conduit 230 to selectively block or permit the passing of exhaust gas from a selected one of the combustion chamber 44 to the intake conduit 60 in response to a signal from the microprocessor 218. A second electronically controlled valve 234 is operatively located in the one of the intake branch passages 56 to selectively block or permit the flow of fresh charge air to the selected one of the combustion chambers 44 by the one intake branch passage 56 in response to a signal from the microprocessor 218.

INDUSTRIAL APPLICABILITY

In use, the engine 10 utilizes the means 76 for unit actuating the intake and exhaust valve means 72 and 74. The microprocessor 218 uses a program logic to process the information provided by the sensors 216 and based upon the results of the analysis supplies an electrical current to selected ones of the piezoelectric motors 136 for actuation of the intake valve unit actuator means 86, the exhaust valve unit actuator means 156, and the fuel injector unit actuator means 194. The intake and exhaust valve operating means 72 and 74 and the fuel injector means 186 are actuated independently of each other and thus, the intake valves 82, the exhaust valves 152, and the fuel injectors 190 are all independently controlled so as to produce optimum timing events of valve opening and closing and fuel injection for various engine 10 operating conditions independent of crankshaft 36 rotational position.

The electronic control means 212 including the electronic control system 208, the control signals, the sensors 216, and the microprocessor 218 is operatively connected to the actuating means 76 to functionally control the engine 10 in the first and second predetermined logic patterns. In the first predetermined logic pattern, the engine 10 is operated in the normal four-stroke mode. In the second predetermined logic pattern, a selected subset of one or more of the combustion chambers 44 are operated in the four-stroke reverse flow motoring mode of operation for exhaust gas recirculation.

In the reverse flow motoring intake stroke, exhaust gas is inducted back into the combustion chamber 44 from the exhaust manifold branch passages 68 during the piston 34 downstroke by opening of the exhaust valve 112. During the reverse flow motoring compression stroke, the exhaust gas is compressed by the piston 34 upstroke. During the reverse flow motoring expansion stroke, the exhaust gas expands during piston 34 downstroke. During the reverse flow motoring exhaust stroke, the exhaust gas is expelled through the intake valve 82 from the combustion chamber 44 by the piston 34 upstroke where it is recirculated with the fresh charge of intake air in the intake manifold branch passages 57. Cooling of the exhaust gas is achieved during the reverse flow motoring compression and expansion strokes by the transfer of heat to the cooler cylinder liner 30. Exhaust gas recirculation lowers NOx by diluting the fresh charge air with the cooled exhaust gas which lowers peak combustion temperatures and thus, reduces NOx production.

As shown in FIG. 4, if additional cooling of the exhaust gas is desired prior to entering the combustion chambers 44, the exhaust gas is directed from the intake manifold branch passages 57 to the intake conduit 60 ahead of the cooler 62.

The electronic control means 212 acts in response to sensed operating parameters of the engine 10 including fuel rack position, nitrogen oxide (NOx), engine speed (RPM), load, boost pressure level, temperature, rpm's, and air-fuel mixture, which causes the control signals to be outputted to the actuating means 76 for operation of the engine 10 in the first or second predetermined logic pattern depending on selected parameters.

The apparatus 11 obtains cooled EGR without any external hardware, such as pipes and pumps, by using the capabilities within the engine 10.

Other aspects, objects and advantages of this invention can be obtained from a study of the drawings, the disclosure and the appended claims.

We claim:

1. An apparatus adapted for use with an engine for exhaust gas recirculation, the engine including a plurality of combustion chambers, an intake port and an exhaust port for each combustion chamber, and a piston being reciprocally movable in each of the combustion chambers between a top dead center position and a bottom dead center position forming an intake stroke, movable between the bottom dead center position and the top dead center position forming a compression stroke, movable between a top dead center position and a bottom dead center position forming an expansion stroke, and movable between the bottom dead center position and the top dead center position forming an exhaust stroke, the apparatus comprising:

flow control means including intake means for selectively blocking and permitting flow into and away from each of the combustion chambers, and exhaust means for selectively blocking and permitting flow into and away from each of the combustion chambers;

means for actuating each of the intake means and the exhaust means independently in response to a control signal; and intake conducting means operatively connected to the intake means for conducting flow into and away from the combustion chambers;

exhaust conducting means operatively connected to the exhaust means for conducting flow into and away from the combustion chambers;

electronic control means responsive to sensed operating parameters of the engine for causing the exhaust means of a selected subset of combustion chambers to be initiated inducting exhaust gas into the combustion chamber from the exhaust conducting means, compressing the exhaust gas in the combustion chamber, expanding the exhaust gas in the combustion chamber, and expelling the exhaust gas into the intake conducting means by initiation of the intake means.

2. The apparatus of claim 1 wherein the intake means includes a plurality of intake valves each operatively mounted in one of the intake ports and intake valve support means for reciprocally supporting the intake valves.

3. The apparatus of claim 2 wherein the intake valve includes an intake valve stem, an intake valve head portion disposed at one end of the intake valve stem and an intake valve retainer disposed at an opposite end, and the intake valve support means includes an intake valve guide encompassing the intake valve stem and an intake valve spring disposed about the intake valve stem.

4. The apparatus of claim 3 wherein the exhaust means includes a plurality of exhaust valves each operatively mounted in one of the exhaust ports and exhaust valve support means for reciprocally supporting the exhaust valves.

5. The apparatus of claim 4 wherein the exhaust valve includes an exhaust valve stem, an exhaust valve head portion disposed at one end of the exhaust valve stem and an exhaust valve retainer disposed at an opposite end, and exhaust valve support means includes an exhaust valve guide encompassing the exhaust valve stem and an exhaust valve spring disposed about the exhaust valve stem.

6. The apparatus of claim 1 wherein the means for actuating includes a piezoelectric motor.

7. The apparatus of claim 1 wherein the electronic control means includes an electronic control system, a control signal, a sensor, and a microprocessor.

8. An apparatus adapted for use with a four-stroke mode engine, the engine including a plurality of combustion chambers, an intake port and an exhaust port for each of the combustion chambers, a turbocharger having a compressor operatively connected to the intake port, a turbine operatively connected to the exhaust port, and a piston being reciprocally movable in each of the combustion chambers between a top dead center position and a bottom dead center position forming an intake stroke, movable between the bottom dead center position and the top dead center position forming a compression stroke, movable between a top dead center position and a bottom dead center position forming an expansion stroke, and movable between the bottom dead center position and the top dead center position forming an exhaust stroke, the apparatus comprising:
  flow control means including an intake valve for selectively blocking and permitting flow into and away from each of the combustion chambers, and exhaust means including an exhaust valve for selectively blocking and permitting flow into and away from each of the combustion chambers;
  means for actuating each of the intake valves and the exhaust valves independently in response to a control signal; and
  intake conducting means operatively connected to the intake means for conducting flow into and away from the combustion chambers;
  exhaust conducting means operatively connected to the exhaust means for conducting flow into and away from the combustion chambers;
  electronic control means for causing the exhaust valve of a selected subset of combustion chambers to be initiated inducting exhaust gas into the combustion chamber from the exhaust conducting means, compressing the exhaust gas in the combustion chamber, expanding the exhaust gas in the combustion chamber, and expelling the exhaust gas into the intake conducting means by initiation of the intake valve.

9. The apparatus of claim 8 wherein the engine includes a cylinder head having a top head surface and the flow control means further includes intake valve support means for reciprocally supporting the intake valves in the cylinder head and exhaust valve support means for reciprocally supporting the exhaust valves in the cylinder head.

10. The apparatus of claim 9 wherein the intake valve includes an intake valve stem, an intake valve head portion disposed at one end of the intake valve stem and an intake valve retainer disposed at an opposite end, and the intake valve support means includes an intake valve guide mounted in the cylinder head and encompassing the intake valve stem and an intake valve spring disposed about the intake valve stem and extending between the top head surface and the intake valve retainer.

11. The apparatus of claim 10 wherein the exhaust valve includes an exhaust valve stem, an exhaust valve head portion disposed at one end of the exhaust valve stem and an exhaust valve retainer disposed at an opposite end, and exhaust valve support means includes an exhaust valve guide mounted in the cylinder head and encompassing the exhaust valve stem and an exhaust valve spring disposed about the exhaust valve stem and extending between the the top head surface and the exhaust valve retainer.

12. The apparatus of claim 8 wherein the means for actuating includes a piezoelectric motor.

13. The apparatus of claim 8 wherein the electronic control means includes an electronic control system, a control signal, a sensor, and a microprocessor.

14. A method of operating an engine having a plurality of combustion chambers, an intake port and an exhaust port for each of the combustion chambers, and a piston being reciprocally movable in each of the combustion chambers between a top dead center position and a bottom dead center position forming an intake stroke, movable between the bottom dead center position and the top dead center position forming a compression stroke, movable between a top dead center position and a bottom dead center position forming an expansion stroke, and movable between the bottom dead center position and the top dead center position forming an exhaust stroke, comprising the steps of:
  (a) monitoring the operating condition of the engine;
  (b) outputting a control signal to intake means and exhaust means;
  (c) actuating each of the intake means and the exhaust means independently in response to a control signal;
  (d) inducting exhaust gas into the combustion chamber from the exhaust conducting means:
  (e) compressing the exhaust gas in the combustion chamber;
  (f) expanding the exhaust gas in the combustion chamber; and
  (g) expelling the exhaust gas into the intake conducting means by initiation of the intake means.

* * * * *